Figure 1:
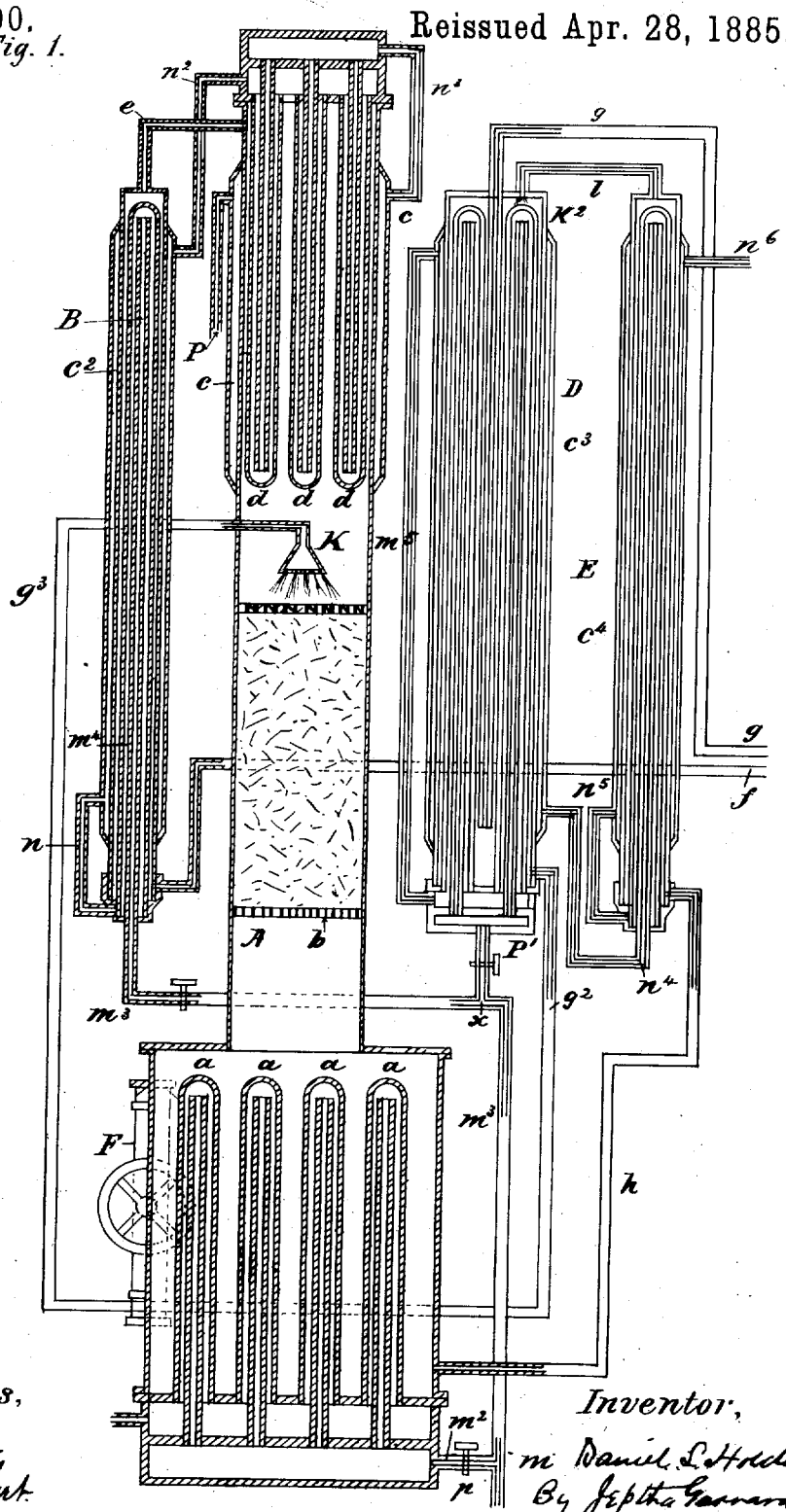

2 Sheets—Sheet 1.

D. L. HOLDEN.

Assignor, by mesne assignments, to the LITTLE GIANT ICE MACHINE COMPANY.

ICE AND REFRIGERATING MACHINE.

No. 10,590. Reissued Apr. 28, 1885.

Witnesses,
S. S. Godley
Jacob J. Ruckert

Inventor,
Daniel L. Holden
By Joseph Gerard
Atty

2 Sheets—Sheet 2.
D. L. HOLDEN.
Assignor, by mesne assignments, to the LITTLE GIANT ICE MACHINE COMPANY.
ICE AND REFRIGERATING MACHINE.
No. 10,590. Reissued Apr. 28, 1885.
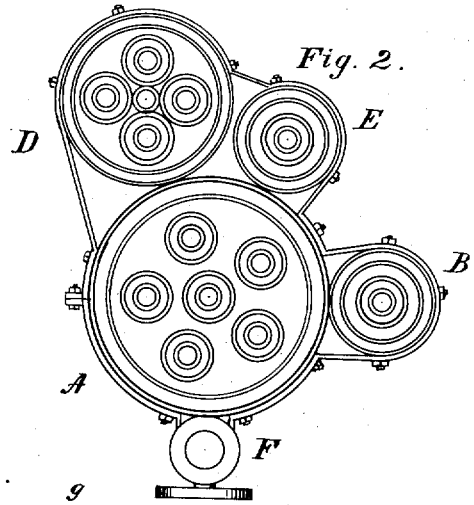
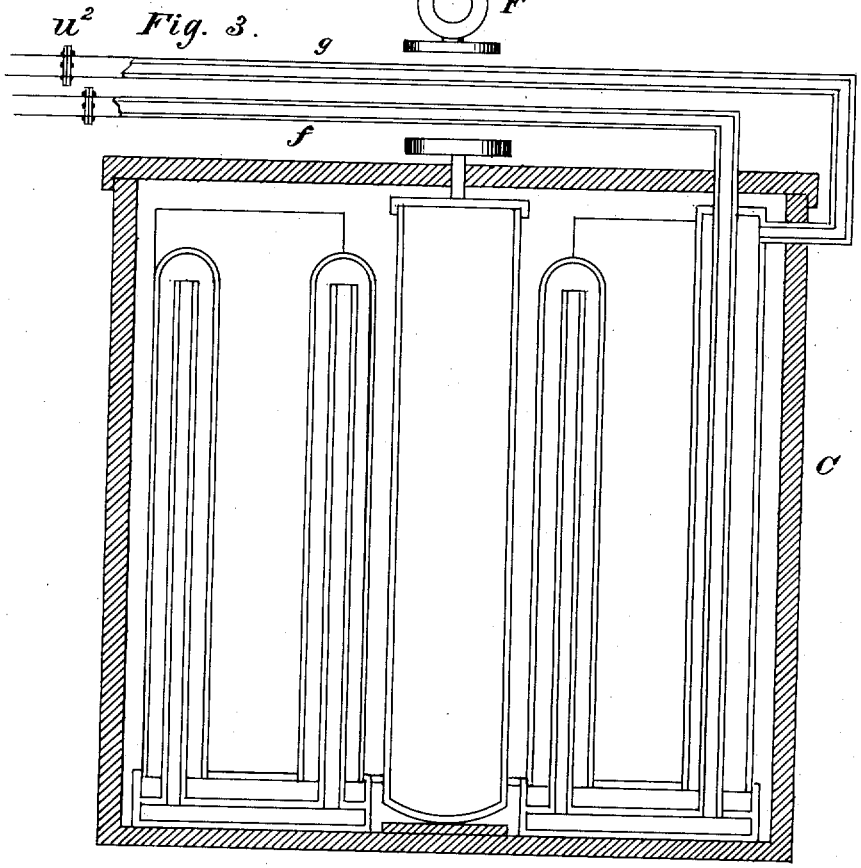
Witnesses,
S. S. Godley.
Jacob J. Ruckert.
Inventor,
Daniel L. Holden
By Jeptha Garrard
Atty

UNITED STATES PATENT OFFICE.

DANIEL LIVINGSTON HOLDEN, OF CINCINNATI, OHIO, ASSIGNOR, BY MESNE ASSIGNMENTS, TO THE LITTLE GIANT ICE MACHINE COMPANY, OF COVINGTON, KENTUCKY.

ICE AND REFRIGERATING MACHINE.

SPECIFICATION forming part of Reissued Letters Patent No. 10,590, dated April 28, 1885.

Original No. 291,477, dated January 1, 1884. Application for reissue filed March 16, 1885.

*To all whom it may concern:*

Be it known that I, DANIEL L. HOLDEN, of Cincinnati, Hamilton county, and State of Ohio, have invented a new and useful Improvement in Ice and Refrigerating Machines, of which the following is a full, clear, and exact specification, reference being had to the accompanying drawings, forming part of this specification, in which—

Figure 1 is a vertical section of my machine. Fig. 2 is a horizontal section, showing condenser, absorber, and cooler and pump securely attached to and supported by the generator. Fig. 3 is a vertical section of congealer and its connecting-pipes.

Similar letters of reference in the several drawings indicate the same parts.

My invention relates to ice and refrigerating machines of the absorption class; and it consists—

First. In arranging the necessary parts of an ice or refrigerating machine in such relation to each other that the machine is compact and portable.

Second. In locating a cooler or devices for cooling within the generator and the usual condenser in ice-machines. These devices render the "recipient" of the ordinary machines unnecessary, and I do not use one in my machine. The cooling devices shown are the pipes *d*, within the generator A, and the jacket *c*, about the top of the generator A, Fig. 1.

Third. In the use of the broken pieces of any substance which is non-corrosive by ammonia within the generator, to receive and break up the incoming "rich liquor."

The construction of my machine, reference being had to the accompanying drawings, is as follows: A generator, A, Fig. 1, is fitted with pipes *a a a*. These pipes are of the "internal-circulating coil" type, as are all the other pipes in my machine. Steam may be admitted to these pipes for heating purposes, and water may also be admitted for cooling purposes. The rapid cooling of the liquor within the generator is of great importance in the practical working of a refrigerating-machine. The generator is fitted with a grating, *b*. On the grating rest pieces of tin, or any substance that is not destroyed by the action of heated ammonia, which fill the generator as far as may be desired toward the top. In the drawings the pieces of tin occupy about one-third of the distance from the grating *b* to the top of the generator. The generator is fitted within with cooling-pipes *d*, and outside with the jacket *c*, to afford a water-space around and outside the top of the generator. This cooling device I claim as new, both in the machinery and in the process of refrigeration.

In ice and refrigerating machines of ordinary construction there is a vessel, called the "recipient," interposed between the generator and the condenser. I do not make use of a recipient, but by means of the pipes *d* and jacket *c* condense the steam mingled with the gas in the generator, and pass the dehydrated gas immediately into the condenser B. This cooling device is not found in any ice-machine with which I am acquainted. It operates as follows: The ammoniacal gas rises to the top of the generator-column, mixed with steam. This mixture ordinarily goes into a recipient, and thence into a condenser; but in my machine the steam is condensed by the above-described cooling device, and the gas thus dehydrated passes to the condenser and the water drops back in the generator-column. This is done without liquefying the ammonia-gas, as steam condenses at a lower temperature than the ammoniacal gas. By the use of this interposed cooler no water is allowed to get into the condenser, and none therefore gets into the congealer. It follows from this that the ammonia is more completely deprived of its water of solution during the process of refrigeration, and a better result is obtained from a given quantity of ammonia in my machine than in the ordinary machines in use, which do not thus separate the steam from the gas.

It is of great practical advantage to prevent water getting into the congealer—first, as its presence frequently leads to the bursting of this part of the machine; second, if there be water in the congealer and the gas comes slowly the water will absorb it and heat the pipes. A pipe, *e*, leads from the top of the generator to the condenser B. Condenser B is surrounded by a jacket, $c^2$. A small pipe, $f$, leads from the condenser to the congealer C, Fig. 3, Sheet 2. A pipe, $g$, leads from the congealer to the absorber D, Fig. 1. The absorber D is surrounded by a jacket, $c^3$. A small rich-liquor pipe, $g^2$, Fig. 1, leads from the bottom of the absorber D to the pump F, by which the rich liquor is forced into the generator A through the pipe $g^3$, having the nozzle K. The pump F is similar in construction to the pump patented to me March 6, 1877, and numbered 188,137.

In absorption ice and refrigerating machines the water charged with ammonia is called "rich liquor," and the water deprived of its ammonia is called "poor liquor."

Having described the course of the ammonia to the absorber D, I now proceed to describe the course of the poor liquor to the absorber.

The gas and water meet at the absorber, and under the influence of cold unite to form rich liquor of the strength of the original solution. As the ammonia is liberated from the water of the solution in the generator by the action of heat, and passes off to the congealer, and thence to the absorber, the water freed from ammonia is led off through the pipe $h$ from the bottom of the generator A, Fig. 1, into the cooler E, which is a pipe filled with internal-circulating-coil-pipes, and having the jacket $c^4$ about it.

From the top of the cooler E is a pipe, $l$, leading within the absorber, having the nozzle $K^2$. The water used for cooling the several parts of the machine is introduced through pipe $m$, Fig. 1. From pipe $m$ water may be introduced into pipes $a\ a\ a$, when required, through pipe $m^2$, by turning the stop-cock $p$. Through pipe $m^3$, which may be simply an extension of pipe $m$, water is introduced into the internal pipe, $m^4$, of the condenser B, whence it runs through pipe $n$ into the pocket $c^2$; thence through pipe $n^2$ into the cooling-pipes $d\ d$ in top of generator A; thence through the pipe $n^3$ into jacket $c$, and is thence discharged through pipe P. The water for cooling the absorber D, Fig. 1, is led from pipe $m^3$ at the point $x$ into the bottom of the absorber D, and thence passes into the cooling-pipes; thence into the chamber P′, near the bottom of the absorber; thence through the pipe $m^5$ into the jacket $c^3$; thence through the small pipe $n^4$ into the pipes of the cooler; thence through the pipe $n^5$ into the jacket $c^4$, and is discharged through the outlet-pipe $n^6$. When water is plenty, it may be introduced directly and from different pipes into any or all the parts of this machine.

It will be seen, reference being had to the accompanying drawings, that the condenser B, absorber D, cooler G, and pump F, Fig. 1, are secured to and supported by the generator. The machine is thus made portable, and may be connected to the congealer by means of the flanges $u$ and $u^2$, Fig. 3, in the pipes $f$ and $g$.

I am aware that it is old to pass pipes into chambers for the purpose of connecting the pipes through such chambers. This construction differs from internal-circulation pipes in which two pipes are employed—an inner and outer—the outer pipe forming the means by which the inner pipe is connected to the pipes or chambers beyond.

I claim—

1. In an absorption ice and refrigerating machine, a generator having cooling devices within and about its upper end, substantially as described.

2. In the generator of an absorption ice or refrigerating machine, the combination of a grating and pieces of tin or other substance not destroyed by heated ammonia resting on said grating, substantially as described.

3. In an absorption ice or refrigerating machine, the combination of a generator, a condenser, an absorber, and a cooler securely attached to and supported by said generator, substantially as described.

4. In an absorption ice or refrigerating machine, the combination of a generator, a condenser, an absorber, a cooler, and a pump securely attached to and supported by said generator, substantially as described.

5. In an absorption ice or refrigerating machine, the combination of a generating-chamber and steam-pipes of the internal-circulation type, substantially as described.

6. In an absorption ice or refrigerating machine, the combination of a generator having cooling devices about its upper end, and a condenser, a congealer, an absorber, and a cooler, substantially as described.

In testimony of which invention I have hereunto set my hand this 24th day of February, A. D. 1885.

DANIEL LIVINGSTON HOLDEN.

Witnesses:

BENJ. H. COX,
JEPTHA GARRARD.